United States Patent Office 3,174,636
Patented Mar. 23, 1965

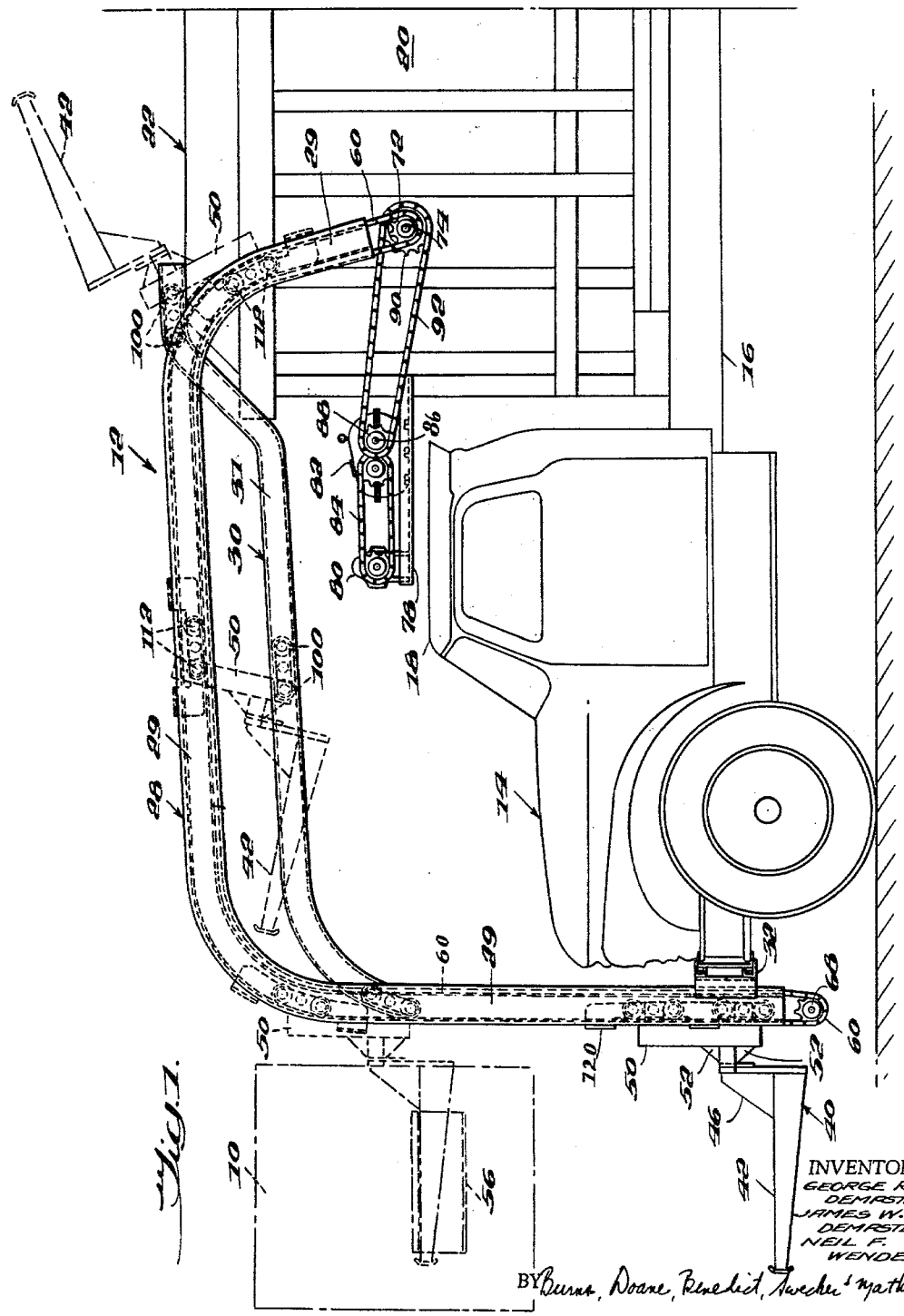

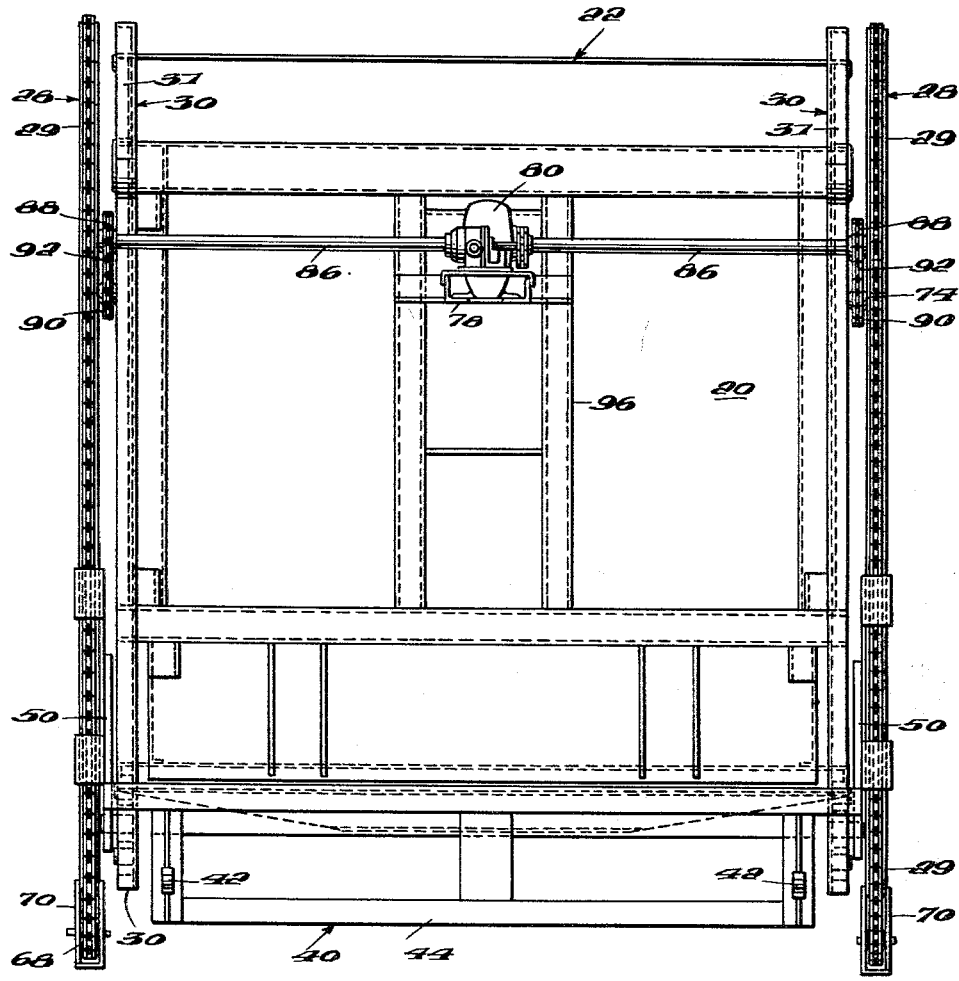

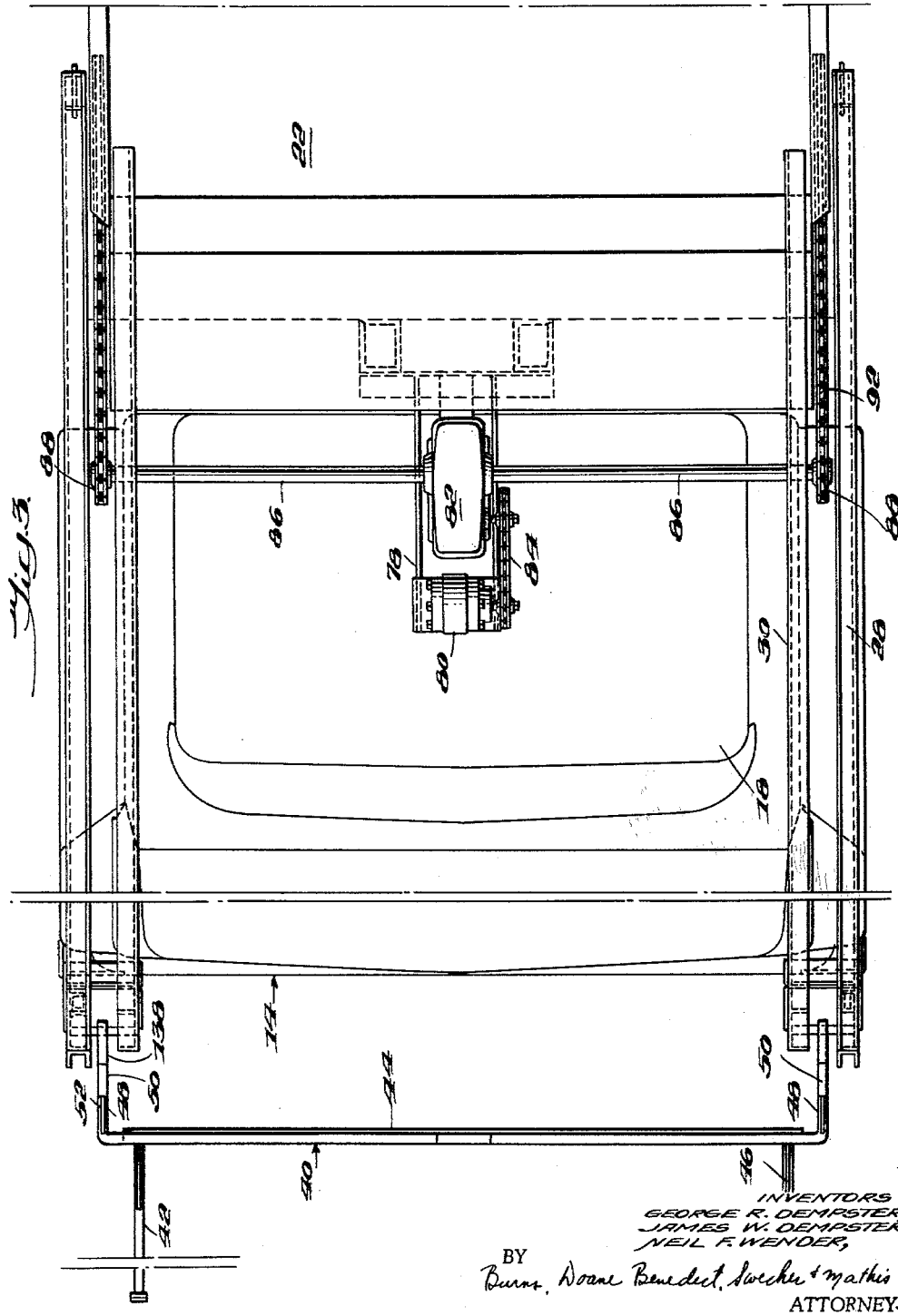

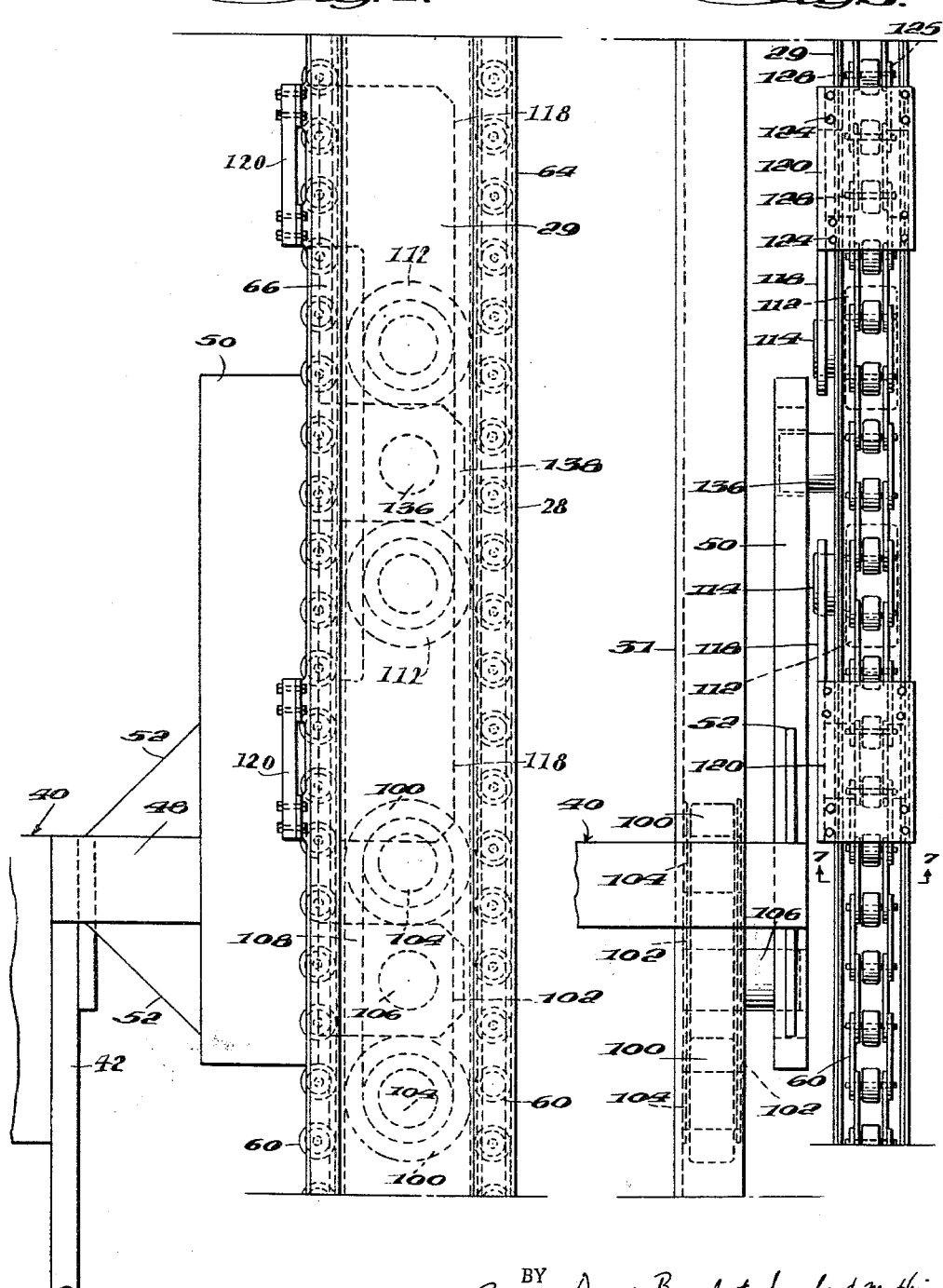

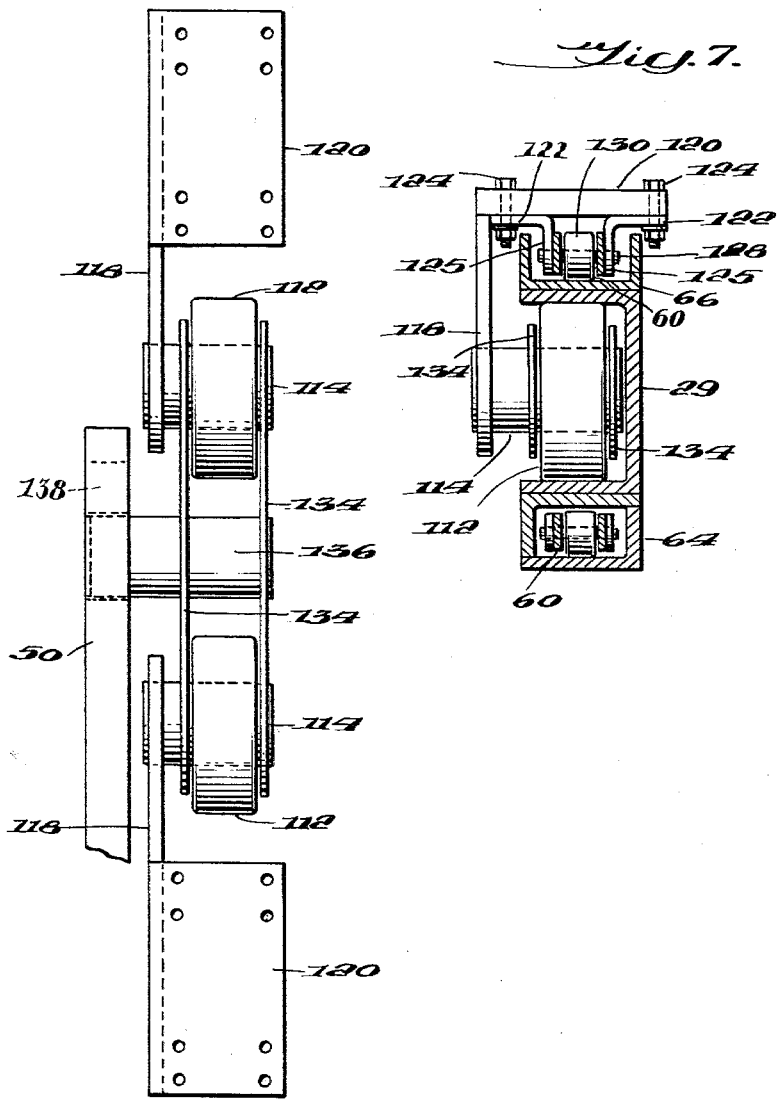

3,174,636
CONTAINER HANDLING EQUIPMENT
George R. Dempster, James W. Dempster, and Neil F. Wender, all of Knoxville, Tenn.; Trust Company of Georgia, executor of said George R. Dempster, deceased; said James W. Dempster and said Wender, assignors to Dempster Brothers, Inc., Knoxville, Tenn., a corporation of Tennessee
Filed Oct. 25, 1961, Ser. No. 147,679
9 Claims. (Cl. 214—302)

This invention relates to container handling equipment of the type which may be mounted on a vehicle and which is commonly referred to as a front end loader.

A convenient and efficient method of handling loose material, such as refuse, for example, is to provide containers of suitable size and shape into which the material can be deposited from time to time. Usually, these containers are relatively large and heavy, requiring these containers to be handled by power actuated mechanism. Containers may be placed at convenient locations for the collection of refuse at apartment buildings, hotels, institutions of various types, restaurants, manufacturing establishments, etc., and then the containers may be emptied after they are filled.

A system for emptying the containers involves the use of a vehicle which can travel from container to container and which is equipped with mechanism for emptying the contents of the containers into a suitable body on the vehicle. After the body of the vehicle is full, the vehicle is driven to a dumping location where the contents of the body are emptied. The vehicle may again be driven from container to container so that the contents of the several containers may be emptied into the body of the vehicle.

This system for handling containers eliminates the need for hauling individual containers, one at a time, to a dumping location as required in the past with other types of container handling systems. The number of trips which the vehicle must make to the dumping location is greatly reduced allowing the vehicle to service a greater number of containers within a given period. Additionally, with this system, it is not necessary to remove the containers from the premises. Consequently, the containers are always ready for receiving material at the point of filling.

One type of vehicle-mounted mechanism employed in this system for handling containers is commonly called a front end loader and which employs a pair of lifting arms pivotally mounted at one end to the vehicle and extending forwardly of the vehicle where a detachable connection is made with a container resting on the ground or other supporting surface. Upon actuation of the lifting arms, the container is hoisted above the cab of the vehicle to a position above the body where the contents of the container are dumped into the body.

Although this type of front end loading device has proved satisfactory in the past, it has been discovered that certain advantages can be gained by a front end loader device which does not employ a pair of pivoted lifting arms. For example, front end loading devices employing lifting arms can be expensive to install and maintain because this type of mechanism requires several power devices for its operation. Additionally, pivoted lifting arms require considerable attention from the operator when manipulating the mechanism in hoisting a container to a position over the body of the vehicle and in dumping the contents of the container into the body.

One object of this invention is to provide a front end loader mounted on a vehicle and capable of establishing a detachable connection with a container located on the ground, or other supporting surface in front of the vehicle, whereby the front end loader can be actuated to hoist the container into dumping position above the body of the vehicle and dump the contents of the container into the body.

Another object of this invention is to provide a front end loader which automatically inverts a container to dump the contents thereof into the body of a vehicle after the container has been hoisted into position above the body.

Another object of this invention is to provide a front end loader which eliminates the use of swinging lifting arms.

Another object of this invention is to provide a front end loader which can be operated to dump the contents of a container into the body of a vehicle with a minimum amount of attention from the operator.

Another object of this invention is to provide a front end loader which is capable of handling large and heavy containers by use of a relatively simple and inexpensive structure.

These objects may be accomplished according to a preferred embodiment of this invention by providing two tracks mounted on the front part of the vehicle to extend from the forwardmost part of the vehicle near the bumper, over the cab of the vehicle, and to a point at the top of the body of the vehicle adjacent a hopper opening. Each track includes two rails which are spaced apart substantially the width of the vehicle. A carriage and fork assembly is mounted by means of rollers for movement along the tracks. The carriage and fork assembly includes a pair of fork arms which extend forwardly of the vehicle when the assembly is in its lowered position for detachable engagement with a container.

Each rail of the first or upper track is formed with a generally vertically extending portion which joins with a generally horizontally extending portion passing over the cab of the vehicle and which in turn joins with a portion extending downwardly along a side of the body of the vehicle. Endless-type roller chains are mounted on the rails of the upper track and are connected with the carriage and fork assembly. Suitable power means are provided for driving the endless chains in order to propel the carriage and fork assembly from a front, lowered position to a raised, dumping position above the body of the vehicle. The endless chains can be driven in the opposite direction to propel the carriage and fork assembly from its raised position back to its lowered position in front of the vehicle.

Each rail of the second or lower track is formed with a generally vertically extending portion which is parallel and adjacent to the vertically extending portion of the corresponding rail of the upper track. This vertical portion joins with a generally horizontally extending portion located beneath the upper track but above the cab of the vehicle. The horizontally extending portion joins with an inclined portion which extends above the body of the vehicle and then joins with a relatively short portion which extends generally horizontally to the end of the rail.

The tracks are shaped and positioned with respect to each other so that when the carriage and fork assembly is moved upwardly along the vertically extending portions of the tracks, with a container thereon, the container is held in a generally upright position. When the carriage and fork assembly travels along the horizontally extending portions of the tracks, the container is held generally upright but tilted slightly toward the body of the vehicle. As the carriage and fork assembly approaches the hopper opening in the body, the movement of the assembly causes the container to tip and dump its contents into the hopper opening. The power device can be operated to drive the endless chain in the opposite direction moving the carriage and fork assembly back to its lowered position to return the container to an upright position on the ground or other supporting surface in front of the vehicle.

Movement of the vehicle in reverse causes the fork arms of the carriage and fork assembly to disengage the container. The vehicle is then free to travel to another container to empty the contents thereof into the body in a similar manner. The vehicle may be driven from container to container to empty the contents of the several containers into the body of the vehicle, and after the vehicle body is full, the vehicle may be driven to a location where the contents may be emptied from the body.

This embodiment of the invention is illustrated in the accompanying drawings in which:

FIG. 1 is a side elevation view of a vehicle equipped with the front end loader of this invention and showing the carriage and fork assembly of the front end loader in various positions;

FIG. 2 is a front elevation view of the front end loader wherein the front portion of the vehicle is not shown for the sake of clarity;

FIG. 3 is a plan view of the front end loader and showing the forward part of a vehicle;

FIG. 4 is an enlarged side elevation view showing in detail the connection between the carriage and fork assembly and the tracks of the front end loader;

FIG. 5 is a front elevation view corresponding with FIG. 4;

FIG. 6 is a front elevation view of part of the structure illustrated in FIG. 5; and FIG. 7 is a cross-sectional view taken along line 7—7 in FIG. 5.

In FIG. 1 there is illustrated in broken lines a container 10 of the type which may be serviced by the front end loader of this invention and which is capable of receiving and holding the material to be handled. This type of container 10 may be closed box-type construction having suitable openings at the top through which material may be deposited from time to time. The top wall of the container 10 is provided with an opening through which material may be dumped when the container is inverted. Suitable doors for the openings may be provided as desired.

The front end loader or container hoisting mechanism is designated by reference numeral 12 and may be mounted on a vehicle 14 of the general type illustrated in FIG. 1. The vehicle 14 has a chassis frame 16 and is self-propelled under the control of an operator located within a cab 18. A body 20 is mounted on the vehicle chassis 16 behind the cab 18 and may be of any suitable type for receiving the particular material to be handled. The body 20 has a hopper opening 22 at the front and top thereof for receiving material from the container 10. Often it is desirable that the interior of the body 20 be provided with a packer mechanism for compressing the material within the body 20 in order to increase its capacity.

The front end loader 12 includes two tracks 28 and 30. The track 28 includes two rails 29 located on opposite sides of the vehicle and the track 30 includes two rails 31 also located on opposite sides of the vehicle. The rails 29 and 31 are channel-shaped in cross-sectional configuration with the rails 29 of the track 28 opening toward the longitudinal center line of the vehicle 14 and the rails 31 of the track 30 opening away from the longitudinal center line of the vehicle. The tracks 28 and 30 are rigidly mounted with respect to the vehicle 14 and are suitably strong to support the weight of the container 10 when full.

Each rail 29 of the first or upper track 28 includes a generally vertically extending forward portion or section, the lower part of which is connected to the bumper or the chassis of the vehicle by means of a mounting bracket 32. The upper part of the forward portion of each rail 29 joins with a generally horizontally extending portion or section passing over the cab 18 of the vehicle. The horizontal portion or section, in turn, joins with a short rear portion or section extending downwardly at a sharp angle. The rear portions of the rails 29 extend along opposite sides of the body 20 and are rigidly connected thereto. Suitable brackets and welding may be employed to accomplish this.

Each rail 31 of the second or lower track 30 has a forward portion which extends generally vertically and adjacent the forward portion of the corresponding rail 29 of the track 28. The lower part of the forward portions of the rails 31 are connected to the bumper or the chassis of the vehicle by the mounting bracket 32. The upper part of the forward portion of each rail 31 joins with a generally horizontally extending portion which extends rearwardly of the vehicle at a level below the horizontal portions of the upper track 28 but above the cab 18 of the vehicle 14 as shown in FIG. 1. The rear part of the horizontally extending portion of each rail 31 joins with an inclined rear portion at a point slightly forward of the front part of the body 20. The inclined rear portion extends upwardly to a level above the hopper opening 22 and joins with a terminal portion which extends a short distance horizontally. These terminal portions of the rails 31 are rigidly connected with the body 20 adjacent the hopper opening 22. Suitable brackets and welding may be employed to accomplish this.

The relative positions of the various portions of the tracks 28 and 30 with respect to each other and with respect to the vehicle 14 are illustrated in FIGS. 1–3. The lateral spacing of the rails of each track corresponds substantially with the width of the vehicle 14 as illustrated in FIG. 3.

A carriage and fork assembly 40 is mounted upon the tracks 28 and 30 for movement therealong. The carriage and fork assembly 40 includes a pair of fork arms 42 spaced apart laterally of the vehicle 14 and fixed upon a cross frame 44 and made rigid therewith by means of suitable plate members 46. The cross frame 44 extends laterally of the vehicle and includes suitable vertical and horizontal members for providing a rigid structure. Legs 48 at each end of the cross frame 44 extend inwardly toward the vehicle. At opposite sides of the vehicle each leg 48 is connected to an elongated tie bar 50, and this connection is strengthened by suitable gussets 52. The fork arms 42, the cross frame 44 and the tie bars 50 are rigidly connected with respect to each other and form a unitary structure.

The container 10 has channel-shaped members or sleeves 56 along opposite ends thereof forming elongated pockets into which the fork arms 42 may be inserted. The spacing of the fork arms 42 laterally of the vehicle corresponds substantially with the width of the container 10 so that the container 10 may fit between the fork arms 42 and against the cross frame 44. Provision may be made for adjusting the spacing between the fork arms 42 in order to accommodate containers of various sizes.

The carriage and fork assembly 40 is propelled along the tracks 28 and 30 by means of endless chains 60 which are comprised of a series of rollers connected by link members. An endless chain 60 is mounted upon and extends along the outer surfaces of the flanges of each rail 29 of the upper track 28 (FIG. 7). An inner mounting guide 64 guides and supports the endless chain 60 along one side of rail 29 and may be made up of angle members attached to the rail 29. This guide 64 is located relative to each rail 29 so as to form a closed guide along the lower edge of the longitudinal section of each rail.

On the opposite side of the rail 29, the same endless chain 60 is guided and supported by an outer mounting channel 66 which opens away from the vehicle 14 and along the upper edge of each rail 29.

The forward and lower end of each endless chain 60 extends around a sprocket 68 pivotally mounted with respect to the lower end of each rail 29 by means of a bracket 70 (illustrated in FIG. 2). The rear end of each endless chain 60 extends around a sprocket 72 on a shaft 74 which is suitably journaled and supported with respect to the track 28.

A power device is provided for driving the endless chain 60 and may be mounted upon a shelf 78 secured to the body 20 above the cab 18. The power device may include a hydraulic motor 80 which drives a speed reduction gear box 82 by means of a chain 84. A drive shaft 86 connected with the gear box 82 extends transversely of the vehicle from side to side and has mounted on opposite ends thereof sprockets 88 which are aligned with corresponding sprockets 90 fixed on the shaft 74. A drive chain 92 extends around the sprockets 88 and 90 for establishing a driving action between the hydraulic motor 80 and the sprockets 72 which support the rear end of the endless chain 60. The motor 80 and gear box 82 should be positioned so that they will not interfere with the container 10. A group of braces 96 may be provided to support the shelf 78 on the body of the vehicle.

Suitable control means are provided inside the cab 18 by which the operator may cause the hydraulic motor 80 to rotate in either rotational direction. Additional controls may be located outside the cab if desired.

The carriage and fork assembly 40 is mounted on the tracks 28 and 30 in an articulated fashion by means of a mounting assembly illustrated in detail in FIGS. 4–7. At each side of the vehicle a pair of rollers 100 forming a trolley are mounted within and guided by the rails 31 of the track 30. Each pair of rollers 100 are connected by a pair of plate-like links 102 which extend along the sides thereof and support shafts 104 about which the rollers 100 rotate. A stub shaft 106 is journalled on the links 102 between the rollers 100 and extends perpendicularly therefrom out of the channel-shaped rail 31 where it is connected to a leg 108 projecting from the adjacent tie bar 50.

A pair of rollers 112 forming a second trolley are mounted within the channel-shaped rail 29 of the track 28 and guided for rolling movement therein. Each roller 112 is mounted on a stub shaft 114 (FIGS. 5, 6 and 7) which extends outwardly through the open side of the rail 29. A fulcrum rocker plate 118 is fixed on the outwardly extending end of each stub shaft 114. The fulcrum rocker plates 118 extend in opposite directions from the respective rollers 112 along the rail 29. Each fulcrum rocker plate 118 is connected with a chain-to-roller tie plate 120 which extends over the opening in the outer mounting channel 66. Angle brackets 122 (FIG. 7) are fastened to the tie plate 120 at opposite edges thereof by means of nut and bolt assemblies 124 and each has a depending leg 125 extending into the mounting channel 66 along each opposite side of one run of the endless chain 60. The depending legs 125 of the angle plates 122 serve as links in the endless chain 60 and are connected to the chain by cross pins 128.

The rollers 112 are connected by links 134 which extend along opposite sides of the rollers 112 and which support the shafts 114. A stub shaft 136 is fixed on a leg 138, rigidly connected with the opposite end of the tie bar 50, and extends within the rail 29 where it is pivotally connected with the links 134 between the rollers 112.

In this manner, each tie bar 50 is pivotally mounted at one end with respect to the rail 29 and pivotally mounted at the other end with respect to the rail 31. The pairs of rollers 100 which support one end of the tie bars 50 are free to travel along the contour of the lower track 30, while the pairs of rollers 112 which support the other end of the tie bars 50 are free to travel along the contour of the upper track 28. The manner in which the fulcrum rocker plates 118 are allowed to move with respect to one another further enhances the articulation of the mounting assembly.

The carriage and fork assembly 40 is fixed rigidly to the tie bars 50 and the position of the tie bars 50 along the tracks 28 and 30 determines the disposition of the carriage and fork assembly 40. At the front of the vehicle, when the carriage and fork assembly 40 is in its lowered position, as illustrated in full lines in FIG. 1, the tie bars 50 extend generally vertically along the tracks 28 and 30 and, the fork arms 42 of the carriage and fork assembly 40 extend forwardly of the vehicle 14. Actuation of the hydraulic motor 80 causes the endless chain 60 to be driven, and the chain in turn pulls the carriage and fork assembly 40 along the tracks 28 and 30 by means of the mounting assembly including the angle plates 122, tie plates 120, the fulcrum rocker plates 118, the stub shafts 114 the links 134, the stub shaft 136 and the arm 138.

As the rollers 100 and 112 roll along the respective tracks 28 and 30 in the generally vertically extending portions at the front of the vehicle, both sets of rollers travel vertically and the tie bars 50 are generally upright. As the rollers 100 and 112 begin to move along the horizontally extending portions of the tracks 28 and 30, the rollers 112 are positioned slightly rearwardly of the rollers 100 and the tie bars 50 are tilted slightly rearwardly, as shown in dotted lines in FIG. 1. In turn, the fork arms 42 are tilted upward in order to tip the container rearwardly but to maintain it generally upright. At the rear of the horizontally extending portion of the track 28, the rollers 112 move gradually downwardly as they follow the contour of the rear portion of the track 28. The rollers 100 are moved upwardly suddenly as they roll onto the upwardly sloping rear portion of the track 30. This movement of the rollers 100 and 112 reverses the relative positions of the rollers to put the rollers 100 above the rollers 112, and in turn to invert the tie bars 50 and the fork arms 42. When a container 10 is being handled, this inverting movement of the carriage and fork assembly 40 will tip the container 10 upside down over the hopper opening 22 in the body 20, and the contents of the container 10 will fall into the body 20.

The hydraulic motor 80 can then be reversed to drive the endless chains 60 in the opposite direction, and the movement of the carriage and fork assembly 40 is reversed to turn the container 10 upright and move it back to a position on the ground or other supporting surface in front of the vehicle 14. Suitable limit stops can be provided at the front end and the rear end of the tracks 28 and 30 in order to limit the traveling movement of the carriage and fork assembly 40.

In the operation of the front end loader 12 for emptying the contents of a separable container 10 into the body 20, the vehicle 14 is driven into position adjacent the container 10 and the fork arms 42 are inserted through the channels 56 on the sides of the container. The height of the fork arms 42 can be adjusted for proper entrance into the channels 56 by operating the hydraulic motor 80. Suitable clearance between the sides of the channels 56 and the fork arms 42 is provided for easy entrance of the fork arms.

After a detachable connection between the carriage and fork assembly 40 and the container 10 has been established in this manner, the operator, while located within the cab 18, can actuate the controls causing the hydraulic motor 80 to drive the endless chains 60 for moving the carriage and fork assembly 40 with the container 10 thereon into dumping position above the hopper opening 22 in the body 20. After the container 10 has been inverted to dump the contents thereof into the body 20, the endless chains 60 can be driven in the opposite direction to place the empty container back onto the ground or other supporting surface in front of the vehicle 14.

The vehicle 14 may be driven in reverse to detach the carriage and fork assembly 40 from the container 10 by pulling the fork arms 42 out of the channels 56. The vehicle 14 may be driven to another container, similar to the container 10, and the dumping operation may be repeated. The vehicle may continue from container to container for emptying the contents thereof into the body 20 until the body is full. Then the vehicle 14 may be driven to a dumping location where the body of the vehicle may be emptied by actuating the packer mechanism to push the contents out of a door at the rear of the body.

The front end loader 12 has several advantages, one of which is the elimination of numerous cylinder and piston devices customarily used on conventional container handling apparatus. In the front end loader 12, a simple power device such as a hydraulic motor 80 supplies all the necessary power for hoisting a container from the ground into a dumping position above the body of the vehicle. Not only is the power apparatus relatively simple and inexpensive, but the control of the moving parts of the front end loader 12 is uncomplicated. The operator has a single control for actuating the hydraulic motor 80. The actual movement of the container from the ground into dumping position and the inverting of the container is automatic and does not require constant attention of the operator or a precise manipulation of the controls. Containers may be picked up from the ground in front of the vehicle, or from a raised loading platform or dock.

The rigid frame type structure afforded by the tracks 28 and 30 is rugged and many accommodate extremely heavy and large size containers. The mounting of the front end loader 12 on a motor vehicle is a relatively simple operation and, because of the simplicity of the front end loader 12, maintenance will be kept to a minimum. Furthermore, the rigid-frame type structure eliminates the conventional type of moving lifting arms.

While the invention has been illustrated and described in one preferred embodiment, it is recognized that other variations and changes may be made therein without departing from the invention as set forth in the claims.

We claim:

1. In a front end loader of the character described, the combination with a motor vehicle of the type having a chassis frame, a body on the frame adapted to receive material therein, and an operator's cab on the frame in front of the body, of a loader mechanism comprising: a first track extending generally vertically at the front of the vehicle and generally horizontally over the cab to the body, a second track extending generally vertically adjacent the first track at front of the vehicle and generally horizontally over the cab below the first track to the body, an assembly mounted on the respective tracks at spaced-apart points for movement along the tracks, and means on the assembly for engaging and hoisting a container from a supporting surface in front of the vehicle to a location over the body and for swinging the container to an inverted position to dump the contents thereof into the body.

2. In a front end loader of the character described, the combination with a motor vehicle of the type having a chassis frame, a body on the frame adapted to receive material therein, and an operator's cab on the frame in front of the body, of a loader mechanism comprising: a first track extending generally vertically at the front of the vehicle and generally horizontally over the cab and then downwardly along the sides of the body, a second track extending generally vertically adjacent the first track at the front of the vehicle and generally horizontally over the cab below the first track and then upwardly toward the top of the body, and an assembly mounted on the respective tracks at spaced-apart points and movable therealong for hoisting a container from a location in front of the vehicle to a location over the body and for swinging the container to an inverted position to dump the contents thereof into the body.

3. In a front end loader of the character described, the combination with a motor vehicle of the type having a chassis frame, a body on the frame adapted to receive material therein, and an operator's cab on the frame in front of the body, of a loader mechanism comprising: a container engaging assembly adapted to be detachably connected to a container, two tracks having spaced-apart rails for guiding the assembly from an upright position in front of the vehicle to an inverted position over the body, a mounting assembly for mounting the container engaging assembly on the rails, and power means for moving the container engaging assembly, said mounting assembly including pairs of rollers on each rail, links connecting the rollers of each pair, and a tie bar pivotally connected at spaced-apart points with the links connecting the rollers on adjacent rails.

4. In a front end loader of the character described, the combination with a motor vehicle of the type having a chassis frame, a body on the frame adapted to receive material therein, and an operator's cab on the frame in front of the body, of a loader mechanism comprising: a container engaging assembly adapted to be detachably connected to a container, two tracks having spaced-apart rails for guiding the assembly from an upright position in front of the vehicle to an inverted position over the body, a mounting assembly for mounting the container engaging assembly on the rails, and power means for moving the container engaging assembly, said power means including an endless chain extending along one of the rails, said mounting assembly including pairs of rollers on each rail, links connecting the rollers of each pair, a tie bar pivotally connected at spaced-apart points with the links connecting the rollers on adjacent rails, and a fulcrum plate connecting one pair of rollers to the endless chain.

5. Container handling equipment adapted to be mounted on a vehicle having a cab and a body behind the cab, said equipment comprising a pair of tracks adapted to be attached at one end to the front of the vehicle and at the other end to the body so as to extend upwardly in front of the vehicle and over the cab to the body, each track comprising a pair of rails spaced-apart laterally of the vehicle, the rails of both tracks being aligned in a generally vertical plane at the front of the vehicle, the rails of the respective tracks being spaced-apart vertically over the cab, one pair of rails extending downwardly at the body, the other pair of rails extending upwardly to the top of the body, a carriage and fork assembly adapted to engage a detachable container for movement with the assembly, and a mounting assembly mounting the carriage and fork assembly on the rails for movement therealong and including rollers on each rail, the rollers on adjacent rails being spaced apart vertically except when the carriage and fork assembly is immediately in front of the body wherein the rollers following the contours of the rails causes the carriage and fork assembly to be inverted to dump the contents of the container into the body.

6. In a front end loader of the character described, the combination with a motor vehicle of the type having a chassis frame, and a body on the frame adapted to receive material therein, of a loader mechanism comprising a first track extending upwardly at the front of the vehicle and over the body, a second track extending upwardly adjacent the first track at the front of the vehicle and over the body, an assembly mounted on the respective tracks at spaced-apart points for movement along the tracks, each of said tracks consisting of three sections, the first section of each track being in a common vertical plane transverse to the vehicle, the second section of one track being vertically spaced from the second section of the other track, and means on the assembly for engaging and hoisting a container from a supporting surface in front of the vehicle to a location over the body and for swinging the container to an inverted position to dump the contents thereof into the body, movement of the assembly from the first section to the second section of the tracks maintaining the container in an upright position while slightly rearwardly tilted, the third section of each track being arranged to cause tilting of the assembly and dumping of the container thereon into the vehicle body.

7. In a front end loader of the character described, the combination with a motor vehicle of the type having a chassis frame, and a body on the frame adapted to receive material therein, of a loader mechanism comprising a first track extending upwardly at the front of the vehicle and over the body, a second track extending upwardly adjacent the first track at the front of the vehicle and over the body, an assembly mounted on the respective tracks at spaced-apart points for movement along the tracks, an endless flexible device extending along one of the tracks and connected with the assembly for moving the assembly therealong, power means for driving said endless flexible device, each of said tracks consisting of three sections, the first section of each track being in a common vertical plane transverse to the vehicle, the second section of one track being vertically spaced from the second section of the other track, and means on the assembly for engaging and hoisting a container from a supporting surface in front of the vehicle to a location over the body and for swinging the container to an inverted position to dump the contents thereof into the body, movement of the assembly from the first section to the second section of the tracks maintaining the container in an upright position while slightly rearwardly tilted, the third section of each track being arranged to cause tilting of the assembly and dumping of the container thereon into the vehicle body.

8. In a front end loader of the character described, the combination with a motor vehicle of the type having a chassis frame, and a body on the frame adapted to receive material therein, of a loader mechanism comprising a first track extending upwardly at the front of the vehicle and over the body, a second track extending upwardly adjacent the first track at the front of the vehicle and over the body, an assembly mounted on the respective tracks at spaced-apart points for movement along the tracks, each of said tracks consisting of three sections, the first section of each track being in a common vertical plane transverse to the vehicle, the second section of one track being vertically spaced from the second section of the other track, and means on the assembly for engageing and hoisting a container from a supporting surface in front of the vehicle to a location over the body and for swinging the container to an inverted position to dump the contents thereof into the body, movement of the assembly from the first section to the second section of the tracks maintaining the container in an upright position while slightly rearwardly tilted, the third sections of the tracks being in crossed relation to cause inverting movement of the assembly and container to dump the container into the vehicle body.

9. In a front end loader of the character described, the combination with a motor vehicle of the type having a chassis frame, and a body on the frame having an elevated access opening therein, of a loader mechanism comprising a first track extending upwardly at the front of the vehicle and over the body, a second track extending upwardly adjacent the first track at the front of the vehicle and over the body, each of said tracks including a pair of rails at opposite sides of the body, an assembly including a tie-bar having trolleys mounted on the rails of the respective tracks at spaced-apart points for movement along the tracks, each of said tracks consisting of three sections, the first section of each track being in a common vertical plane transverse to the vehicle, the second section of one track being vertically spaced from the second section of the other track, means on the tie-bar of the assembly for engaging and hoisting a container from a supporting surface in front of the vehicle to a location over the body and for swinging the container to an inverted position to dump the contents thereof into the body, movement of the assembly from the first section to the second section of the tracks maintaining the container in an upright position while slightly rearwardly tilted, the third section of each track being arranged to cause tilting of the assembly and dumping of the container thereon into the vehicle body.

References Cited in the file of this patent

UNITED STATES PATENTS

| | | |
|---|---|---|
| 1,492,675 | Clark et al. | May 6, 1924 |
| 1,686,053 | Wheatley | Oct. 2, 1928 |
| 1,771,285 | Blackwood et al. | July 22, 1930 |
| 1,780,064 | Buzzo | Oct. 28, 1930 |
| 1,943,398 | Sargent | Jan. 16, 1934 |
| 2,456,434 | Manthie | Dec. 14, 1948 |
| 2,592,324 | Oliver | Apr. 8, 1952 |
| 2,647,651 | Vincent | Aug. 4, 1953 |
| 2,703,227 | Hughes | Mar. 1, 1955 |
| 2,740,539 | Oaks | Apr. 3, 1956 |
| 2,831,590 | Greenfield et al. | Apr. 22, 1958 |
| 2,900,096 | Dempster et al. | Aug. 18, 1959 |
| 3,012,813 | Reese | Dec. 12, 1961 |

FOREIGN PATENTS

| | | |
|---|---|---|
| 510,294 | Canada | Feb. 22, 1955 |